United States Patent [19]

Baasch et al.

[11] Patent Number: 4,813,033
[45] Date of Patent: Mar. 14, 1989

[54] TWO AXIS ELECTROMAGNETIC ACTUATOR WITH AXIS BALANCED SUSPENSION

[75] Inventors: Holger J. Baasch, Rochester; Francis S. Luecke, Byron, both of Minn.

[73] Assignee: International Business Machines Corporation, Armonk, N.Y.

[21] Appl. No.: 793,050

[22] Filed: Oct. 30, 1985

[51] Int. Cl.⁴ .................... G11B 7/09; G02B 7/02
[52] U.S. Cl. .......................... 369/45; 369/44; 350/247; 350/255
[58] Field of Search .................... 369/43–46, 369/13; 250/201 D, 201 F, 202, 201; 360/114; 350/247, 252, 255

[56] References Cited

U.S. PATENT DOCUMENTS

| | | | |
|---|---|---|---|
| 4,462,096 | 7/1984 | Kusaka | 369/45 |
| 4,507,764 | 3/1985 | Musha | 369/44 X |
| 4,507,765 | 3/1985 | Suzuki et al. | 369/44 X |
| 4,516,231 | 5/1985 | Michaelis | 369/44 |
| 4,568,142 | 2/1986 | Iguma | 350/255 X |
| 4,592,037 | 5/1986 | Ohnuki | 369/44 |
| 4,607,913 | 8/1986 | Jansen | 350/255 X |
| 4,613,202 | 9/1986 | Kuriyama | 369/45 X |
| 4,633,456 | 12/1986 | Luecke | 250/201 X |
| 4,646,283 | 2/1987 | Ito et al. | 350/255 X |

FOREIGN PATENT DOCUMENTS 0153459 9/1985 European Pat. Off. .
3344262 6/1984 Fed. Rep. of Germany .
2212673 7/1974 France .

OTHER PUBLICATIONS

Patent Abstracts of Japan, vol. 6, No. 200 (E-135) (1078), 10/9/82, JP-57-110069.

Primary Examiner—Alan Faber
Assistant Examiner—W. R. Young
Attorney, Agent, or Firm—Homer L. Knearl

[57] ABSTRACT

A two axis electromagnetic actuator is designed for moving an optical element in an optical or magneto-optical recorder. The actuator has balanced, crossed, electro-magnetic coil structures supported by two sets of leaf springs and positioned in dual air gaps for motion in a direction which is the vector sum of the movement in two orthogonal directions. In the actuator the motive forces and the masses of the moving elements are centered on the axis of major motion. Also leaf springs, that allow the major motion, have their forces balanced about the axis of major motion.

12 Claims, 6 Drawing Sheets

TWO AXIS ELECTROMAGNETIC ACTUATOR WITH AXIS BALANCED SUSPENSION

FIELD OF THE INVENTION

This invention relates to electromagnetic actuators and more particularly to an improved two axis electromagnetic actuator for use in a data storage system.

DESCRIPTION OF THE PRIOR ART

Electromagnetic actuators are widely used in data storage systems to access a desired track on an information bearing medium and then follow it with the required accuracy. For example, optical or magneto-optical data storage systems use a laser to generate a beam of radiation. The beam is directed by beam guiding means onto a rotating disk having information to be recorded or information previously recorded on a spiral or circular track by means of pits or holes in optical media and magnetization in magneto-optical media.

Such systems need to have fast access to the track either for writing information at a predetermined point on the track or for reading written information at any point on the track. After the laser beam is correctly positioned with respect to the radial position of the spiral or circular track on the disk, the beam guiding means has to be positioned the correct distance above the track so that the laser beam remains correctly focused on the track. Such systems are more completely described in the article "Optical Data Storage Technology Status And Prospects" by A. E. Bell, *Computer Design*, January 1983, pages 133-146.

In the prior art, access to the track or radial position control of the laser beam guiding means is usually accomplished by electro-mechanical means which operate to provide a displacement of the beam guiding means relative to the disk. Focusing or vertical position control is obtained by means of an electromagnetic coil which moves an optical element. An important drawback of such a system is that a tracking assembly separate from the focusing assembly increases both the size and the mass of the system and complicates the mounting and alignment.

In co-pending commonly-assigned U.S. Pat. No. 4,633,456 filed Jan. 23, 1984, and issued Dec. 30 1986 a two-axis electromagnetic actuator for rapidly moving an optical element for tracking and focusing is described. This actuator has balanced, crossed, electromagnetic coil structures supported by two sets of leaf springs. The optical element is mounted with the crossed coil structures and positioned between two air gaps in the magnetic field paths for the actuator. When the coils are excited, the leaf springs permit the optical element to move in a direction that is the vector sum of the movement in two orthogonal directions. In this way, the actuator can make rapid tracking and focusing corrections.

The two-axis actuator works very well but is susceptible to vibrations due to mass imbalance about the axes of movement and due to variable spring forces during movement along the tracking direction.

SUMMARY OF THE INVENTION

In accordance with this invention, the two-axis actuator has been improved by centering the mass of the carrier and the mass of the cross box mount for the leaf spring suspension assembly along a first axis of motion for the actuator, and during such motion by balancing the forces in the motion direction about this first axis in both directions orthogonal to the first axis.

The two axis actuator has been further improved by reducing the number of leaf springs mounting the suspension cross box to the main frame. By reducing the number of springs to two, the suspension assembly does not hitch or toggle if the lengths of the springs are not absolutely matched.

Also, the two axis actuator has been improved by orienting the field-magnet mounts so that forces acting on the magnets are balanced about the first axis. In addition for a magneto-optic recording, the magnets themselves should be polarized in the same direction on the mounts so that stray fields in the vicinity of the optical element on the carrier are parallel to the recording media.

DESCRIPTION

Figure 1:
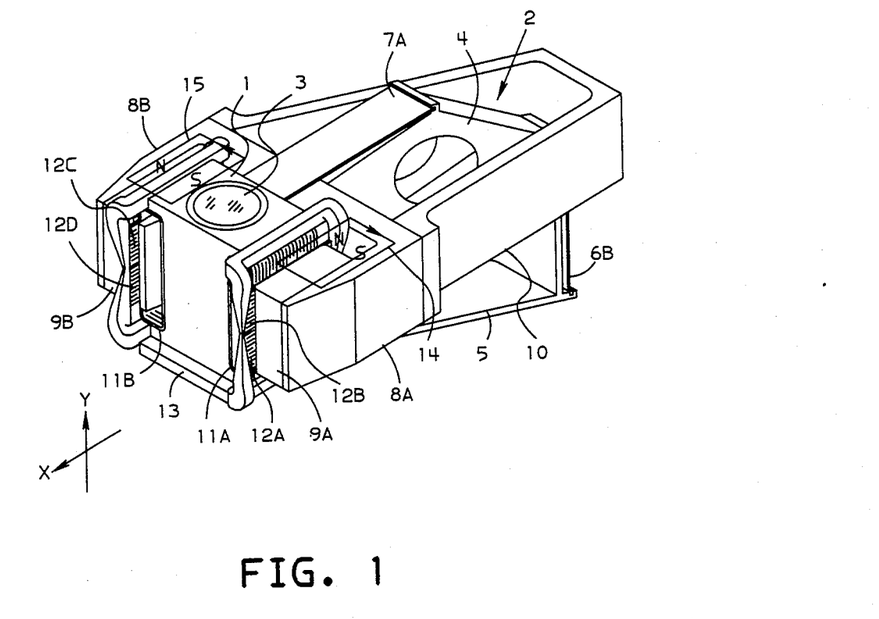
FIG. 1 is an isometric view of a two axis electromagnetic actuator according to the invention.

FIG. 1 shows a two axis electromagnetic actuator capable of a finely controlled motion along the X and Y axes. As used in an optical data storage system, the motion along the X-axis provides radial access to and track following of the desired data track, and motion along the Y-axis is for the purpose of accommodating movement of the disk which would tend to throw the system out of focus. Accordingly, the X-axis is the direction or axis of major motion for the actuator.

Figure 2:
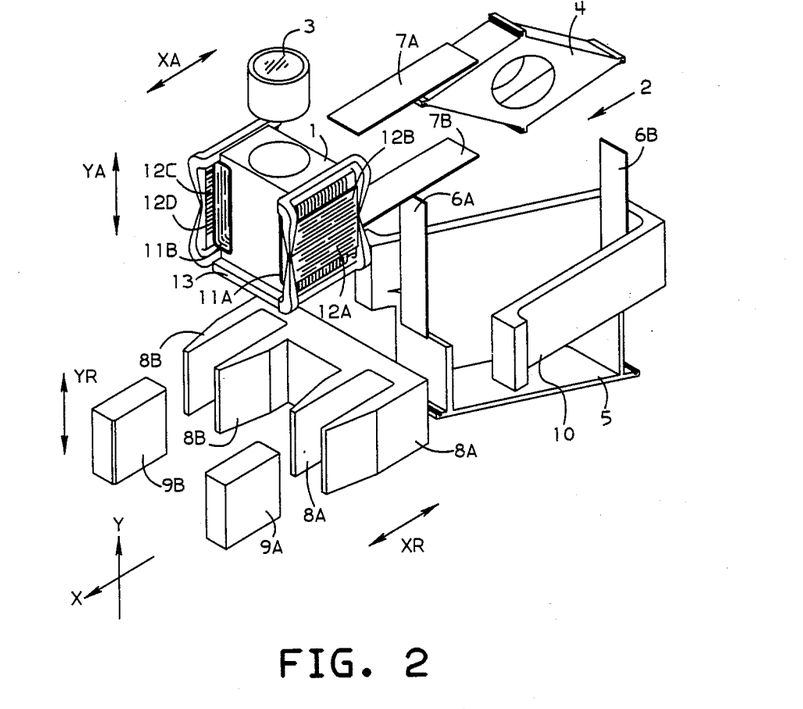
FIG. 2 is an exploded view of the electromagnetic actuator of FIG. 1.

In FIG. 1 and FIG. 2, the actuator comprises an armature or carrier 1 and a suspension assembly 2. Armature 1 can carry any work element for the task to be performed. Preferably it carries an optical element, such as a mirror, a prism or an objective lens 3 set for use with the read/write head of an optical data storage system as described in the article by A. E. Bell.

Suspension assembly 2 comprises a skewed "symmetric" cross box 4 which is attached at two first opposite corners thereof to a base or frame member 5 by a first set of parallel resilient members, such as leaf springs 6A and 6B. These X-axis leaf springs extend perpendicularly to base member 5 and allow suspension assembly 2 to move carrier 1 along the X-axis to place objective lens 3 in the correct radial position.

Cross box 4 is attached at two second opposite corners thereof to carrier 1 by a second set of parallel resilient members, such as leaf springs 7A and 7B. These Y-axis leaf springs extend parallel to base member 5 and allow carrier 1 to move along the Y-axis to focus the system by positioning the objective lens 3.

Figure 3A:
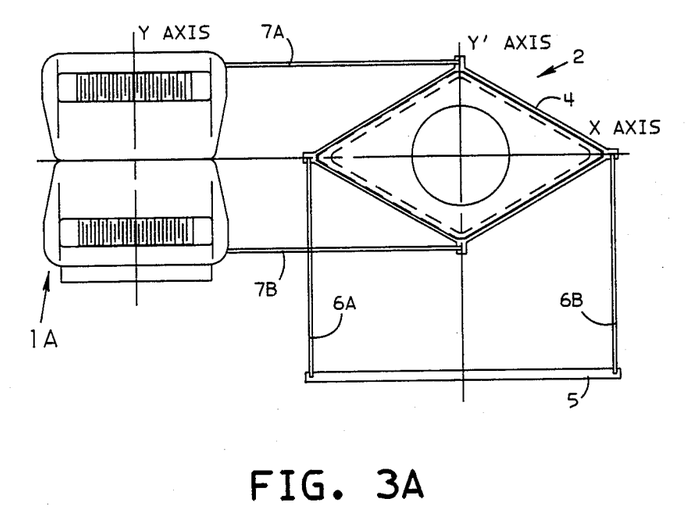
FIGS. 3A, 3B and 3C are, respectively, a side view, a top view and a view from the rear of the actuator of FIG. 1 with the static parts removed for clarity.
Figure 3B:
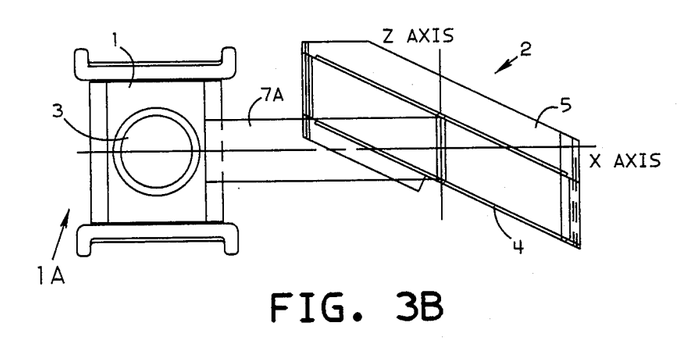
Figure 3C:
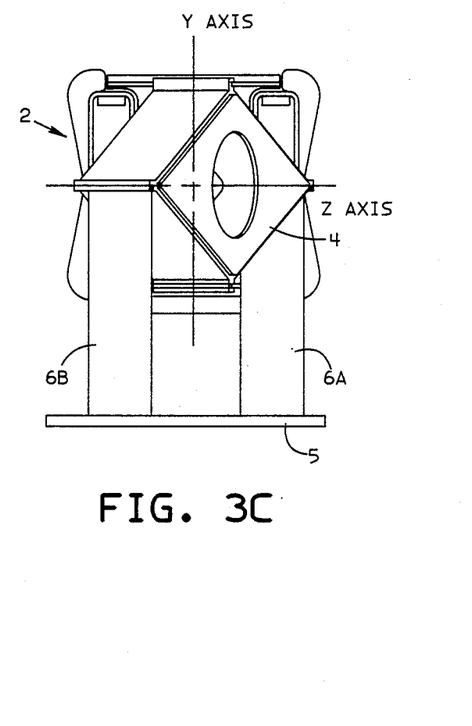

In FIGS. 3A, 3B and 3C, cross box 4 is canted at an angle to armature 1 so that X-axis leaf springs 6A and 6B are symmetrically offset with respect to the X Y' axes of cross box 4 to accommodate movement of Y-axis leaf springs 7A and 7B. Leaf springs 6A, 6B, 7A, 7B allow carrier 1 to move freely in the X-Y plane but prevent motion in any other direction. The offset mounting of two leaf springs 6A and 6B preserves symmetry of masses and forces about the X Y' Z axes of the cross box.

Because only two leaf springs 6A, 6B are used, the leaf springs do not have to be perfectly matched in length in order to achieve smooth motion along the X-axis. In other words with only two leaf springs there is no tendency of the suspension assembly to hitch or toggle. To illustrate the hitch problem, which occurs when four leaf springs are used, remember that two points define a line, three points define a plane, and four points define a plane and a point unless all four points are in the same plane. Therefore, the two-axis actuator, in the above-mentioned U.S. Pat. No. 4,633,456, having four leaf springs for X-axis movement must have all the springs precisely matched in length; otherwise the X-direction motion will be irregular.

An important consideration of placement of components is balancing of action/reaction forces and aligning of masses to minimize the effect they have on each other. To this end, referring to FIG. 2, placement of yokes 8A, 8B becomes important. XA and YA are action forces, XR and YR are reaction forces. Of the action forces, XA is the largest for a given movement of the armature/coil assembly. Movement in the XA direction has the added mass of cross box 4 while movement in the YA direction does not.

Yokes 8A, 8B are dynamically balanced about the reaction point (center of mass of magnets 9A and 9B) in the XR direction but are not balanced in the YR direction. The actuator works best when the largest action force, XA, is in the same plane as the balanced reaction force, XR.

Yokes 8A and 8B are mounted to frame member 10 so that the larger reaction force XR acts normal to frame member 10 rather than twisting frame member 10. Further, the XR force is centered along the X-axis. Mounting the yoke in this manner reduces vibrations in the actuator.

Most important in overcoming unwanted vibrations in the carrier is symmetry of mass of the carrier assembly 1A and of cross box 4 relative to the X-axis. By placing the center of mass of the carrier assembly and the center of mass of the cross box on the X-axis and by centering X-direction forces along the X-axis, motion along the X-axis will be stable and free of oscillations away from the X-axis.

In FIGS. 3A, 3B and 3C, the mass of the carrier assembly 1A is balanced about the X-axis in both the Y and Z directions. The mass of the electromagnetic coils attached to carrier 1 are balanced about the X-axis, and a member 13 is fixed to carrier 1 to balance the mass of objective lens 3 relative to the X-axis. Also, the mass of cross box 4 is balanced about the X-axis in both the Y' and Z directions.

In FIGS. 3A and 3B, it can be seen that X-component forces in the leaf springs 7A, 7B resulting from motion along the X-axis are balanced about the X-axis in the Y and Z directions. Similarly, X-component forces in leaf springs 6A, 6B resulting from motion along the X-axis are balanced about the X-axis in the Y and Z directions. The result is that all of the X-component force for an X-direction move is centered along the X-axis which is also the axis on which the mass of the carrier assembly and the cross box are centered. Therefore, the motion of the carrier assembly along the X-axis is smooth, and carrier assembly vibrations are substantially zero.

At operating frequencies, stability in motion of the carrier assembly 1A along the Y-axis is substantially independent of the leaf springs 7A, 7B and cross box 4. Operating frequencies of 1-20 khz are much higher than the fundamental natural frequency of the carrier and suspension assembly. The fundamental frequency depends on the spring constants and masses of the elements in the assembly and is typically 100 hz. The mass of the carrier assembly 1A is centered on the Y-axis. The electromagnetic forces acting in the Y-direction are balanced about the Y-axis. Thus the center of mass and the Y-component forces are centered on the Y-axis, and the motion of carrier assembly 1A along the Y-axis is smooth.

Leaf springs 6A, 6B are alike and leaf springs 7A, 7B are alike. The springs may be made of a graphite-epoxy composite material, stainless steel, titanium, beryllium or other spring material. The spring material should provide a high stiffness/density ratio, reducing the mass of the springs, while maintaining the longitudinal stiffness. This reduces the contribution of the springs to the system resonances.

In FIG. 2, two magnetic flux circuits are formed by yokes 8A, 8B and permanent magnets 9A, 9B, attached near the ends of outer legs 20A, 20B of yokes 8A, 8B, defining two air gaps. Yokes 8A, 8B may be formed in one piece and attached to a generally U-shaped frame member 10 extending from base element 5.

Two coils 11A, 11B attached to carrier 1 are wound with a cavity inside the coil. These cavities allow the coils to surround the inner legs of yokes 8A, 8B so that the individual conductors form thin webs and are oriented along the Y-axis in the region of the air gaps. The coils' cavities should be large enough to accommodate movement of coils 11A, 11B around yokes 8A, 8B along the Y-axis.

Four coils 12A, 12B, 12C, 12D are positioned near coils 11A, 11B, respectively, in such a way that the individual conductors form thin webs and are oriented along the X-axis in the region of the air gaps. Outside of the air gaps the conductors form bundles.

Figure 4:
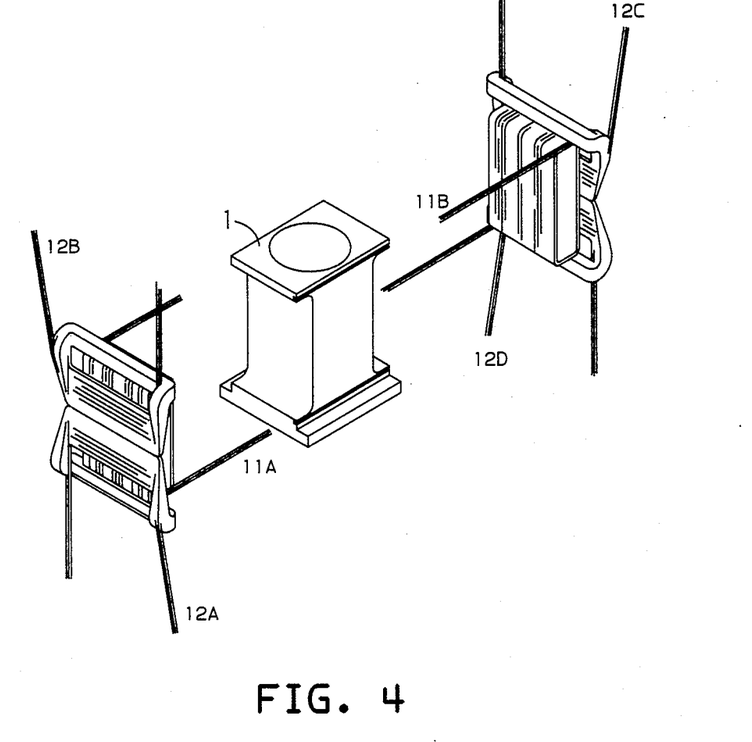
FIG. 4 is an isometric view of the layout of the coils and the the armature or optical element carrier of the electromagnetic actuator of FIG. 1.

FIG. 4 illustrates the layout of coils 11A, 11B, 12A, 12B, 12C, 12D and the way they are positioned with respect to each other, respectively. Coils 11A, 11B, 12A, 12B, 12C, 12D are given the desired shape by winding around a specially shaped mandrel and bonding the individual windings together. The coil assemblies are then bonded to carrier 1 as shown in FIGS. 1 and 2.

The magnetic flux paths across the two magnetic circuits are shown by arrows 14 an 15 in FIG. 1. When a current is applied to coils 11A and 11B the magnetic flux path is directed in such a manner as to produce a force perpendicular to the direction of coils 11A and 11B in a direction dependent on the polarity of the current. This force in the X direction is balanced about the center of mass of carrier 1 and acts as if all of the force is directed along the X-axis.

Similarly, when a current is applied to coils 12A, 12B, 12C and 12D the magnetic flux path is directed in such a manner as to produce a force perpendicular to the direction of coils 12A, 12B, 12C and 12D. This force acts on carrier 1 and consequently will move it along the Y-axis in a direction dependent on the polarity of the current. The force is balanced about the center of mass of carrier 1 and acts as if all of the force is directed along the Y-axis.

Distance and direction of motion along the X and Y axes is proportional to amplitude and polarity of current through coils 11A, 11B and 12A, 12B, 12C, 12D, respectively. Accordingly, radial and vertical positioning of objective lens 3 can be obtained by applying to coils 11A, 11B, 12A, 12B, 12C and 12D currents of appropriate amplitudes and polarities. The movement is the vector sum of the simultaneous motion along the X and Y axes. There is no need to wait until movement along one axis is complete before initiating movement along the other.

In the usual case, the magnitude and polarity of the drive coil current will be controlled according to signals indicating the focus and track positioning errors. Means for developing such signals are well known.

Figure 5A:
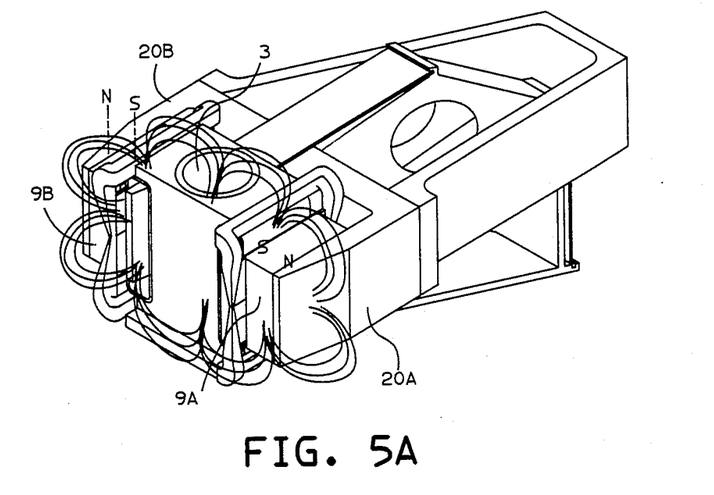
FIGS. 5A and 5B are isometric views of the two-axis actuator indicating the fringing magnetic fields produced by the actuator for two different orientations of the permanent magnets.
Figure 5B:
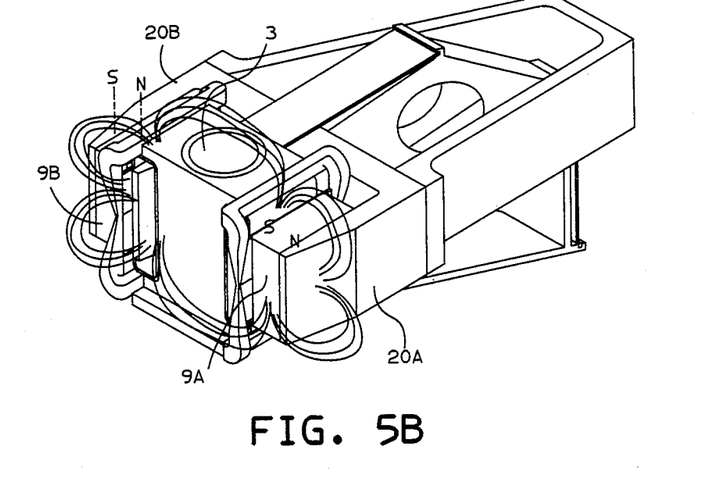

FIGS. 5A and 5B illustrate stray fields from the permanent field magnets 9A and 9B. In FIG. 5A, magnets 9A and 9B are poled in opposite directions; in FIG. 5B, the magnets are poled in the same direction. Either configuration may be used where optical recordings are being scanned. However if the recordings are magneto-optical, the configuration in FIG. 5B is preferable.

In magneto-optical recording, a bias field is used in conjunction with a focussed laser spot, to switch the direction of magnetization of minute spots on a disk. The bias field used is typically about 300 oersteds in a direction normal to the disk surface. Any fields in the same or opposite direction coming from a source other than the bias electromagnet will cause the net field at the disk to be some value other than that desired.

The stray fields produced by the actuator in FIG. 5A in the vicinity of lens 3 are parallel with the optical axis and thus normal to the surface of the magneto-optic media. Such a stray field could disrupt the bias field and disturb erasing or writing on the magneto-optic media.

FIG. 5B shows the field which results from parallel orientation of the magnets. The stray field in the vicinity of lens 3 is normal to the optical axis and thus parallel to the magneto-optic media. This field will have little or no effect on the desired bias field used when erasing or writing on the magneto-optic media.

While we have illustrated and described the preferred embodiments of our invention, it is understood that we do not limit ourselves to the precise constructions herein disclosed, and the right is reserved to all changes and modifications coming within the scope of the invention as defined in the appended claims.

What is claimed is:

1. An actuator for displacing an element for deflecting and/or focusing a beam of radiation impinging on a storage medium in a data storage system comprising:
    a movable carrier for carrying said element;
    electro-magnetic means for applying forces on said carrier to move said carrier in a direction, which is the vector sum of motion along first and second orthogonal axes, said forces being substantially centered on the center of mass of said carrier;
    a suspension mount assembly with its center of mass located along said first axis which also passes through the center of mass of said carrier, said assembly having two sets of paired suspension mounting locations, said mounting locations in each pair being offset an equal distance and in opposite directions from the center of mass of said mount assembly;
    first springs parallel with said first axis and connected between one set of paired mounting locations on said suspension assembly and said movable carrier to permit movement of said carrier along said second axis substantially orthogonal to said first axis;
    second springs parallel to said second axis and connected between the other set of paired mounting locations on said suspension assembly and a base member to permit movement of said carrier along said first axis;
    said mount assembly being skewed to at least one of said axes so that said second springs will not interfere with said first springs.

2. The actuator of claim 1 wherein said electro-magnetic means comprises:
    first and second yokes attached to said base member;
    first and second permanent magnets fixed to one extension of said first and second yokes, producing uniform magnetic flux fields across a first and a second air gap;
    a first set of coils attached to said carrier and wound with a cavity so that one coil surrounds a second extension of said first yoke and another coil surrounds a second extension of said second yoke so that the individual conductors in said coils form a thin web oriented parallel to said second axis in the region of said first and second air gaps;
    a second set of coils attached to the carrier and positioned near said first set of coils in such a way that the individual conductors in the coils form a thin web oriented parallel to said first axis in the region of said first and second air gaps.

3. A two axis actuator according to claim 2 wherein:
    a current is applied to said first set of coils to generate magnetic flux in a first direction thereby producing a force on said carrier and said coils moving them along said first axis.

4. A two axis actuator according to claim 3 wherein:
    a current is applied to said second set of coils to generate magnetic flux in a second direction thereby producing a force on said carrier and said coils moving them along said second axis.

5. A two axis actuator according to claim 4 wherein:
    the distance and direction of carrier motion is responsive to the amplitude and polarity of said applied currents.

6. The actuator of claim 2 wherein:
    said first and second yokes are attached to said base member with an orientation such that reactive forces in said yokes parallel to said first axis are balanced about said first axis.

7. The actuator of claim 2 wherein:
    said first and second magnets are polarized to produce magnetic fields in the same direction across both said first and second air gaps.

8. The actuator of claim 2 wherein:
    said first and second magnets are polarized to produce the magnetic field across said first air gap in opposite direction to the magnetic field across said second air gap.

9. An actuator for displacing an element for deflecting and/or focusing a beam of radiation impinging on a storage medium in a data storage system comprising:
    a movable carrier for carrying said element;
    electro-magnetic means for applying forces on said carrier to move said carrier in two directions, said forces being substantially centered on the center of mass of said carrier;

a suspension mount assembly with its center of mass located along a first axis through the center of mass of said carrier, said assembly having two sets of paired suspension mounting locations, said mounting locations in each pair being offset an equal distance and in opposite directions from said first axis;

first springs parallel with said first axis and connected between one set of paired mounting locations on said suspension assembly and said movable carrier to permit movement of said carrier along a second axis substantially orthogonal to said first axis;

second springs parallel to said second axis and connected between the other set of paired mounting locations on said suspension assembly and a base member to permit movement of said carrier along said first axis;

said first and second springs each consists of a pair of leaf springs with the leaf springs in each pair attached to said mounting means on opposite sides of and equidistant from said first axis, and one pair of leaf springs flanks the other pair of leaf springs.

10. In a two axis actuator having a carrying means for carrying a work element and electromagnetic actuator coils, a frame with a magnetic field source attached to said frame, and a suspension assembly for said carrying means, said suspension assembly having a mounting means for mounting first spring means connecting said mounting means to said carrying means along a major axis of motion for said carrying means and for mounting second spring means connecting said mounting means to said frame along a minor axis of motion for said carrying means whereby said carrying means is movable along said major and minor axes relative to said frame, the improvement comprising:

the center of mass of said carrying means being located on the major axis of motion;

the center of mass of said mounting means being located on the major axis of motion;

said first and second spring means being attached to said mounting means at locations where the components of force, directed parallel to the major axis of motion in both of said spring means, are balanced about the major axis of motion;

said first and second spring means each consists of a pair of leaf springs with the leaf springs in each pair attached to said mounting means on opposite sides of and equidistant from the major axis of motion.

11. In the actuator of claim 10, the improvement further comprising:

said magnetic field source producing fields balanced about the axis of major motion and oriented so that reactive forces parallel to the axis of major motion are centered along the axis of major motion.

12. In the actuator of claim 11, said field source comprises:

a pair of magnets with each magnet mounted on opposite sides of and equidistant from the axis of major motion and with both magnets polarized in the same direction so that stray fields adjacent the recording media are parallel to the surface of the media.

* * * * *